June 5, 1951 V. S. MARKOVITZ 2,555,594

PHONOGRAPH DISK RECORD PACKAGE

Filed Sept. 13, 1948

Inventor

VICTOR S. MARKOVITZ

By Samuel Slomit

ATTORNEY

UNITED STATES PATENT OFFICE 2,555,594

PHONOGRAPH DISK RECORD PACKAGE

Victor S. Markovitz, Philadelphia, Pa.

Application September 13, 1948, Serial No. 49,090

2 Claims. (Cl. 206—62)

This invention relates to a container for a plurality of phonograph disc records adapted to facilitate the simultaneous mounting of the plurality of records onto a spindle of a record reproducing machine adapted to play a plurality of records successively, of the type in general use today.

It is the object of the present invention to provide a rugged and economical container for a plurality of phonograph disc records which is used advantageously in the manner of a charging cartridge for the purpose of rapidly and conveniently guiding a plurality of juxtaposed disc records onto the spindle of a record playing machine.

It is a further object of the present invention to provide a combined package of phonograph disc records with a special container therefor which may be used as an album for the records as well as a charging device for aligning a plurality of records in position for rapid mounting thereof onto the spindle of a record player, eliminating the need for mounting each of the records individually.

The invention proceeds upon the principle of providing a prismatic container for housing a plurality of phonograph disc records in juxtaposed relation and in substantially fixed position, which container is fitted with radially disposed slots in the opposed faces thereof so that the central openings in the records, in the nested position of the records within the container, find themselves aligned near the base of the radial slots so that the disposition of the container above the spindle adjacent to the base of the slots enables all of the records to be mounted simultaneously upon the spindle, and thereafter the slots permit a transverse withdrawal of the container from the spindle. The slots need be of a width not greatly in excess of the thickness of the spindle so that a rugged and compact container is attainable despite the special provision of the radial slots therein.

Other objects and purposes will appear from the detailed description of the invention following hereinafter, taken in conjunction with the accompanying drawing, wherein Fig. 1 is a perspective view showing the cooperation of a container in accordance with the present invention with a record player for playing a plurality of records in succession;

Figures 1, 2, 3:
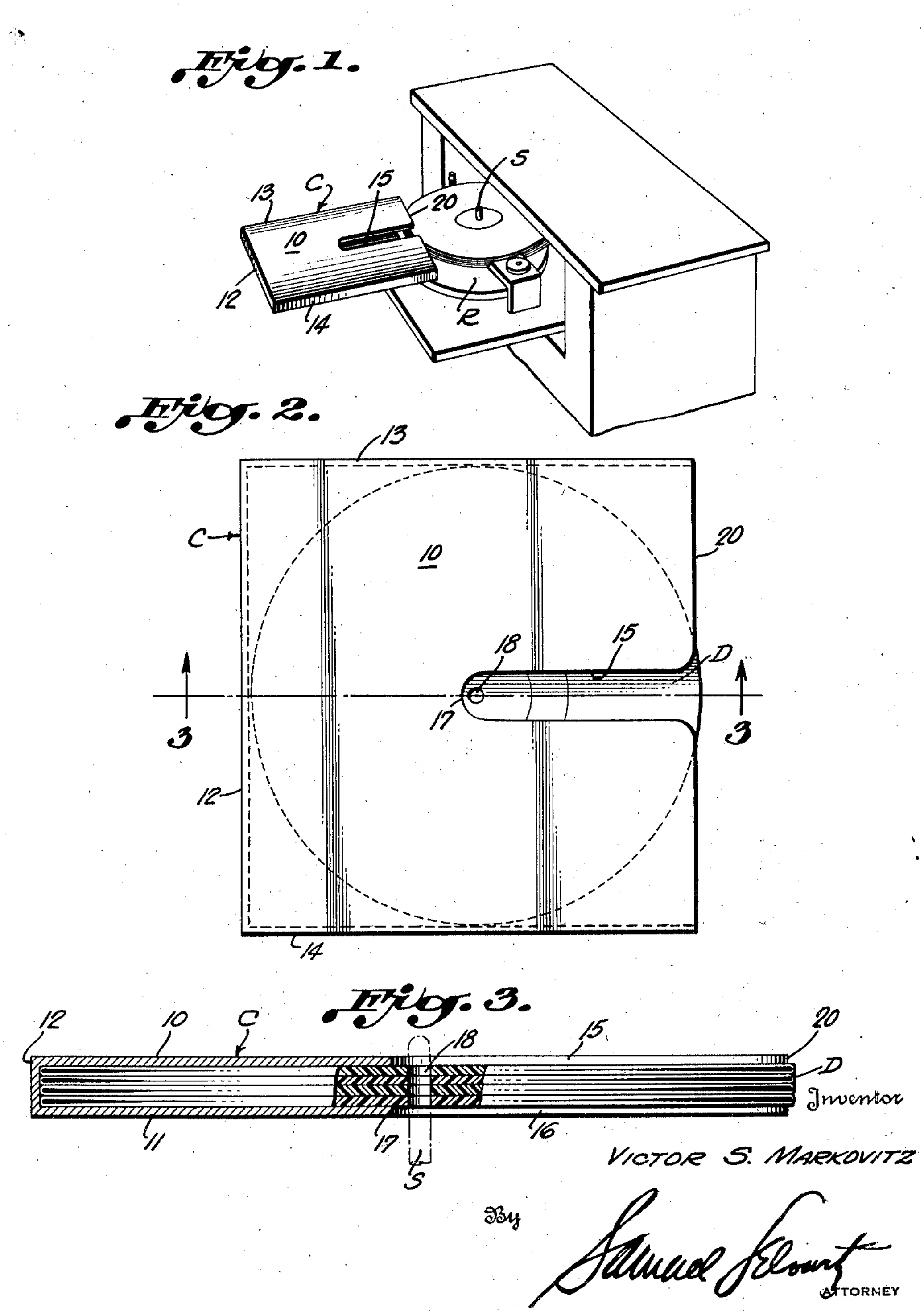
Fig. 2 is a plan view of the package of records within the container.
Fig. 3 is a vertical sectional view along line 3—3 of Fig. 2.

In Fig. 1 is shown a phonograph disc record reproducing machine R of the type in general use today, which is designed to reproduce automatically and in succession a plurality of disc records which are mounted onto the spindle S of the machine. The mounting of the records onto the spindle has been found to be a tedious and time-consuming operation, particularly when the operation is performed under poor lighting conditions. The primary object of the invention is to enable a selected group of records to be nested within the improved container in accordance with the invention for rapid guiding and mounting of these records onto the spindle, involving but a single operation which may be executed with neatness and dispatch and without fumbling with the individual records.

The container C, as shown in Fig. 1, is formed of suitable semi-rigid sheet material which may be cardboard, plastic, sheet metal or the like, and is built up as a prismatic substantially square body having two spaced faces 10 and 11 which are joined by lateral walls 12, 13 and 14, so that the records may be inserted into the container and withdrawn therefrom through the open end of the container at 20.

A pair of radial slots 15 and 16 extend from near the center of the record towards the open side 20 of the container and preferably perpendicularly thereto. The base of each of these slots is formed as an inwardly converging end wall 17 and is disposed slightly beyond the center of the faces 10 and 11 of the package so that when the disc records D are in their fully nested position, the center holes 18 in the records are exposed at the base of the slots and preferably a distance therefrom which is less than the diameter of the central openings 18 in the records. The end wall 17 flares towards the open end 20 of the container. The definite location of the central openings 18 closely adjacent to the end wall 17 enables a convenient alignment of the spindle S with these openings, and in view of the fact that the plurality of records are maintained in juxtaposed position, the whole group of records may be threaded rapidly onto the spindle as a unit. Thereafter the container C may be withdrawn in a direction transverse to the spindle by virtue of the radial slots 15 and 16, leaving the records on the spindle for reproduction by the machine.

While Fig. 3 shows only four disc records within the container, it is readily understood that the containers may be made of varying depths to accommodate a larger number of records so that a larger number may be arranged for mounting onto the spindle for sequential reproduction in a desired order.

The radial slots may vary in outline, for example they may be in the shape of a triangle with the apex just beyond the central openings in the records, in order to satisfy the requirement that the slots have a restricted area at the central openings to facilitate the guiding of the openings onto the spindle. Preferably the slots are congruous on each face of the container but this expedient is not essential to the realization of the full benefits of the invention.

While I have described my invention as embodied in a specific form and as operating in a specific manner for purpose of illustration, it should be understood that I do not limit my invention thereto, since various modifications will suggest themselves to those skilled in the art without departing from the spirit of my invention, the scope of which is set forth in the annexed claims.

I claim:

1. A package of phonograph disc records having central circular openings and a container therefor adapted to permit the rapid and convenient mounting of the entire pack of records onto a spindle of a record-reproducing machine, said container being formed of semi-rigid sheet material and composed of two spaced faces and three lateral walls therebetween for retaining the plurality of records therein in substantially fixed position, said faces having a pair of substantially congruous radial slots each terminating in an inwardly converging end wall near the center of the face and flaring outwardly towards the open side of said container through which records may be inserted into and withdrawn from said container, said central openings in the disc records lying within the slots adjacent to said end walls and spaced therefrom a distance less than the diameter of said openings to permit a conjoint alignment of the openings to be made preparatory to a simultaneous mounting thereof onto a spindle of a record-reproducing machine followed by a transverse withdrawal of the container from the records as permitted by the radial slots in said container.

2. An open-ended container for a pack of phonograph disc records, said container being formed of semi-rigid sheet material and composed of two spaced substantially square panels defining front and rear faces and three lateral walls therebetween for retaining the pack of records in substantially fixed position, said faces having a pair of substantially congruous radial slots, each extending inwardly from the midportion of the edge at the open end and terminating in a closed end slightly beyond the center of the faces, each of the said slots being defined solely by spaced parallel side edges which inwardly converge at the closed end, whereby the opening in the disc records may lie within the slot closely adjacent the closed end, thereby permitting the rapid and convenient mounting of the entire pack of records on to a spindle of a record-reproducing machine.

VICTOR S. MARKOVITZ.

REFERENCES CITED

The following references are of record in the file of this patent:

FOREIGN PATENTS

| Number | Country | Date |
|---|---|---|
| 555,632 | Germany | July 28, 1932 |